(12) United States Patent
You

(10) Patent No.: US 8,913,036 B2
(45) Date of Patent: Dec. 16, 2014

(54) OPTICAL TOUCHSCREEN AND ELECTRONIC DEVICE USING SAME

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 256 days.

(21) Appl. No.: 13/457,558

(22) Filed: Apr. 27, 2012

(65) Prior Publication Data

US 2013/0162599 A1 Jun. 27, 2013

(30) Foreign Application Priority Data

Dec. 26, 2011 (CN) .......................... 2011 1 0440915

(51) Int. Cl.
*G06F 3/042* (2006.01)
(52) U.S. Cl.
USPC .......................................... 345/175; 345/173
(58) Field of Classification Search
None
See application file for complete search history.

(56) References Cited

U.S. PATENT DOCUMENTS

| | | | | |
|---|---|---|---|---|
| 5,150,067 | A * | 9/1992 | McMillan | 327/181 |
| 2011/0001725 | A1* | 1/2011 | Kurokawa | 345/174 |
| 2012/0092290 | A1* | 4/2012 | Itoh et al. | 345/174 |
| 2012/0212451 | A1* | 8/2012 | Large et al. | 345/175 |
| 2013/0135189 | A1* | 5/2013 | Yin et al. | 345/156 |
| 2013/0135319 | A1* | 5/2013 | Ma et al. | 345/501 |

\* cited by examiner

*Primary Examiner* — Joe H Cheng
*Assistant Examiner* — Yaron Cohen
(74) *Attorney, Agent, or Firm* — Novak Druce Connolly Bove + Quigg LLP

(57) ABSTRACT

A touchscreen for an electronic device includes a first substrate, a second substrate opposite to the first substrate, and photosensors disposed on the first substrate. The second substrate includes a first surface and a second surface opposite to the first surface. When a first light at a first wavelength enters the second substrate via the second surface, the second substrate emits the first light at the first wavelength from the first surface. The second substrate further totally reflects the first light at a second wavelength. The plurality of photosensors detect the first light at the first wavelength penetrating through the second substrate, and output corresponding detecting signals.

18 Claims, 4 Drawing Sheets

OPTICAL TOUCHSCREEN AND ELECTRONIC DEVICE USING SAME

BACKGROUND

1. Technical Field

The present disclosure relates to touch technology, especially to a touchscreen and an electronic device using the touchscreen.

2. Description of Related Art

As portable electronic devices become more widely used, a user-friendly, simplified and convenient operation of an input device is increasingly important. Touchscreen input devices can handily meet many of such demands.

A commonly used touchscreen is a resistive touchscreen or a capacitive touchscreen. However, due to the structure and materials of the touchscreen, contact coordinates calculated by the touchscreen are apt to be inaccurate. Accordingly, the stability of the touchscreen may be influenced. As a result, the quality of the portable electronic device employing the touchscreen may deteriorate, and the enjoyment of the portable electronic device may be diminished.

What is needed, therefore is a touchscreen and an electronic device using the touchscreen that can overcome the aforementioned problems.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the various views.

DETAILED DESCRIPTION

Reference will be made to the drawings to describe specific exemplary embodiments of the present disclosure.

Figure 1:
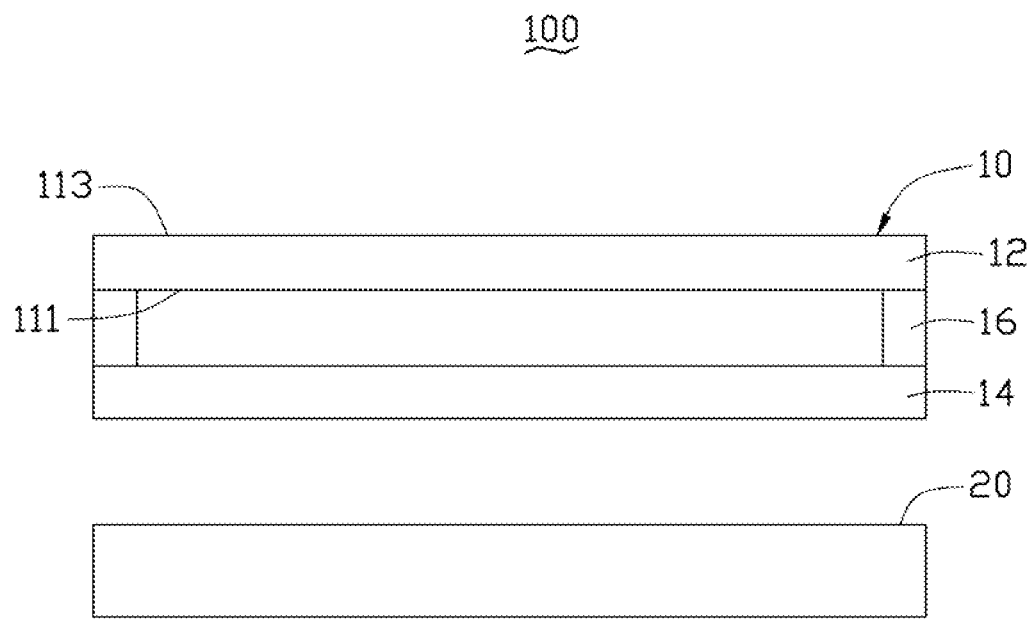
FIG. 1 is a schematic structural diagram of one embodiment of an electronic device including a touchscreen and a display device, the touch screen including a first substrate, a second substrate and a supporting element.

FIG. 1 is a schematic structural diagram of one embodiment of an electronic device 100 including a touchscreen 10 and a display device 20. The touchscreen 10 is disposed near an emitting surface (not labeled) of the display device 20. The touchscreen 10 may be used as an input interface for user operations, and detects contact positions corresponding to the user operations. The touchscreen 10 further outputs positional coordinates of the contact positions to the display device 20. The display device 20 receives the positional coordinates, and performs corresponding functions, such as, playing video, acting as a telephone, for example. The display device 20 may be, an organic electroluminescence display (OLED), or a liquid crystal display (LCD), for example.

The touchscreen 10 includes a first substrate 14, a second substrate 12 opposite to the first substrate 14, and an adhesive layer 16. The first and second substrates 14, 12 are both transparent or substantially transparent. The adhesive layer 16 is disposed between the first and second substrates 14, 12, and corresponds to a peripheral area of the first and second substrates 14, 12 to secure the first and second substrates 14, 12 together.

The second substrate 12 includes a first surface 111 close to the first substrate 14 and a second surface 113 opposite to the first surface 111. The thickness between the first surface 111 and the first substrate 14 may be, 1.5 mm, for example. The first and second surfaces 111, 113 each may act as an incident surface and an emitting surface, respectively. Display light from the emitting surface of the display device 20 is capable of penetrating through the first substrate 14 and then entering the second substrate 12 via the first surface 111. External ambient light is capable of entering the second substrate 12 via the second surface 113.

When different surfaces 111, 113 act as the incident surface, the second substrate 12 has different optical properties. In detail, when the display light hits the first surface 111, the first surface 111 acts as the incident surface, the second surface 113 acts as the emitting surface. Under this condition, the display light penetrates through the second substrate 12, and is emitted from the second surface 113. Further, when the external ambient light hits the second surface 113, the second surface 113 acts as the incident surface, the first surface 111 acts as the emitting surface. Under this condition, the ambient light at a specific wavelength penetrates through the second substrate 12, and is emitted from the first surface 111, and the ambient light at other wavelengths are totally reflected by the second substrate 12. At the present disclosure, the ambient light at the specific wavelength may be the ultraviolet rays, for example. The ambient light at the other wavelengths may be the visible light and the infrared rays, for example.

Figure 2:
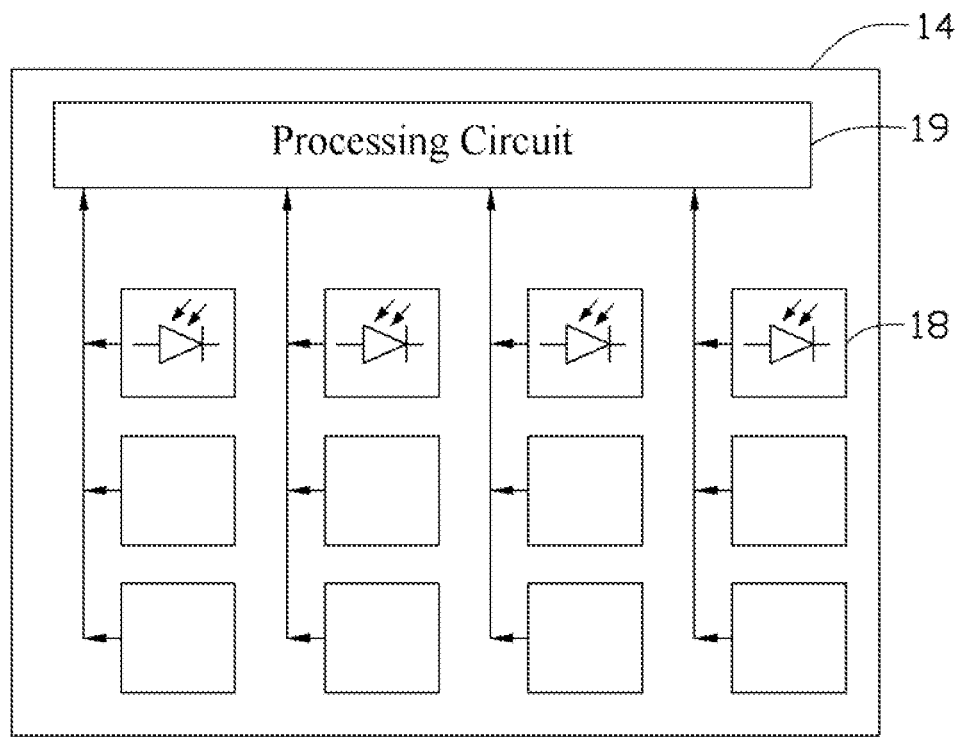
FIG. 2 is a schematic structural diagram of the first substrate of the touchscreen of FIG. 1.

FIG. 2 is a schematic structural diagram of the first substrate 14. A plurality of photosensors 18 and a processing circuit 19 are disposed on an inner surface of the first substrate 14 close to the first surface 111 of the second substrate 12. The photosensors 18 are arranged in a matrix. The photosensors 18 are configured to detect the ambient light at a specific wavelength penetrating through the first substrate 14, and output corresponding detecting signals to the processing circuit 19. The processing circuit 19 is electrically connected with the plurality of photosensors 18, and receives the detecting signals from the photosensors 18. The processing circuit 19 further calculates the positional coordinates of the contact positions based on the detecting signals, and outputs the positional coordinates to the display device 20. The display device 20 receives the positional coordinates, and performs corresponding functions. The photosensors 18 may be, photodiodes or phototriodes, for example.

Figure 3:
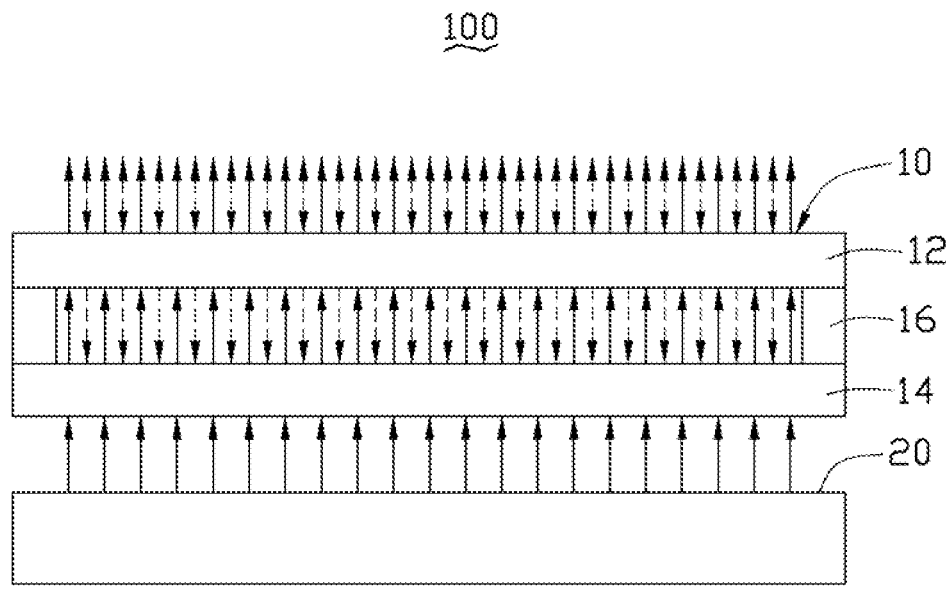
FIG. 3 is a light path diagram of the electronic device of FIG. 1 that is not being touched by an object.
Figure 4:
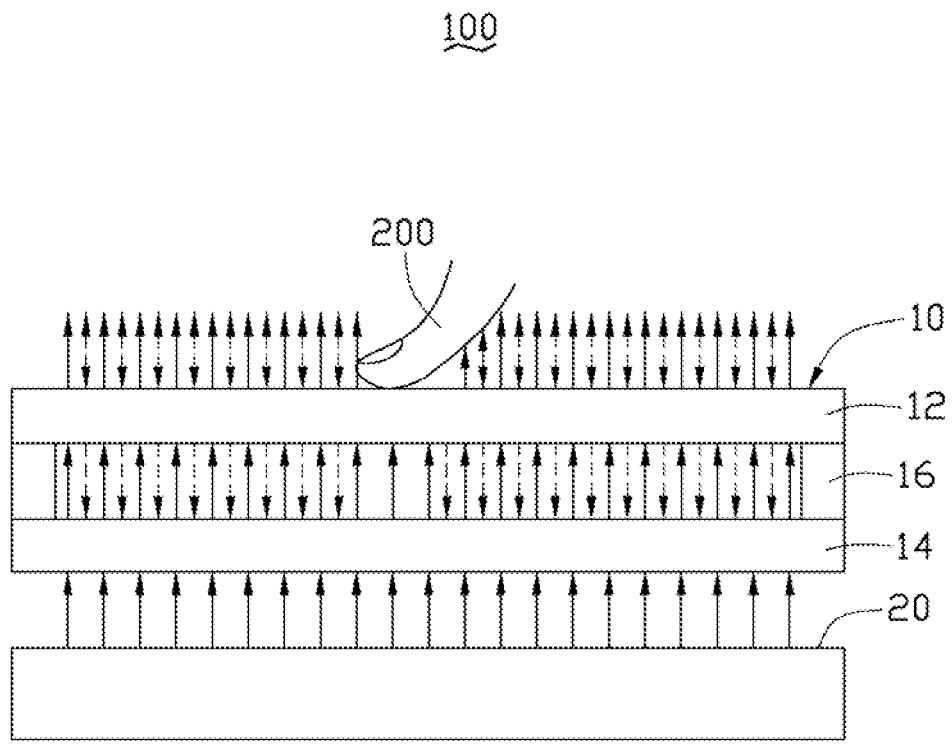
FIG. 4 is a light path diagram of the electronic device of FIG. 1 that is being touched by the object.

Referring to FIGS. 3 and 4 together, FIG. 3 is a light path diagram of the electronic device 100 that is not being touched by an object. FIG. 4 is a light path diagram of the electronic device 100 that is being touched by an object 200, such as, a finger of users, or a stylus. Solid arrows are representative of the light path of the display light from the display device 20. Dashed arrows are representative of the light path of the external ambient light. The operation of the electronic device 100 is as follows.

When the touchscreen 10 is not touched by the object 200, intensity of the ambient light at the specific wavelength received by the photosensors 18 are substantially the same. Correspondingly, the photosensors 18 output a plurality of detecting signals to the processing circuit 19. The processing circuit 19 receives the detecting signals, and determines whether the detecting signals from each of the photosensors 18 are substantially the same via the comparison. If the detecting signals from each of the photosensors 18 are substantially the same, the processing circuit 19 determines that the touchscreen 10 is not being touched, and does not output any positional coordinates to the display device 20.

When the touchscreen 10 is being touched by the object 200, the ambient light at the specific wavelength, which hits the object 200, is absorbed or reflected by the object 200. Accordingly, the photosensors 18 corresponding to the object 200 detect less ambient light at the specific wavelength than other photosensors 18 do, and then output different detecting signals to the processing circuit 19 from the other photosensors 18 do. The processing circuit 19 acquires the positional coordinates of a contact position where the touchscreen 10 is touched, based on the detecting signals from the plurality of photosensors 18, and then outputs the positional coordinates to the display device 20. Accordingly, the display device 20 performs a corresponding function, based on the positional coordinates. The detecting signals from the photosensors 18 corresponding to the object 200 may be, for example, smaller or larger than the detecting signals from the other photosensors 18.

As described, since the touchscreen 10 includes the plurality of photosensors 18, the positional coordinates calculated by the touchscreen 10 is relatively more accurate due to the good stability of the photosensors 18. The photosensors 18 detect the intensity of the ambient light at the specific wavelength penetrating through the second substrate 12, and acquire the positional coordinates of the contact position where the touchscreen 10 is touched by the object 200. Due to the good stability of the photosensors 18, the positional coordinates calculated by the touchscreen 10 is relatively more accurate. Accordingly, the stability of the touchscreen 10 is much better. As a result, the quality of the electronic device 100 employing the touchscreen 10 possesses higher reliability.

Similarly to the above operation of the single touch, the multi-touch is also applicable to the touchscreen 10. The operation of the multi-touch is not described any more.

It should be pointed out that in alternative embodiments, the touchscreen 10 may be incorporated into the display device 20. The processing circuit 19 may also be disposed on a flexible printed circuit (FPC) board or a printed circuit board (PCB) instead of the first substrate 14, and connects to the photosensors 18 and the display device 20. In order to avoid a touch misoperation on the touchscreen 10 by the object 200, a certain time interval may be set in the processing circuit 19. When the processing circuit 19 continuously receives the different detecting signals for a duration of time exceeding that of the certain time interval, the processing circuit 19 can correspondingly output the positional coordinates to the display device 20.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A touchscreen, comprising:
   a first substrate;
   a second substrate opposite to the first substrate, comprising:
     a first surface close and opposite to the first substrate; and
     a second surface opposite to the first surface; and
   a plurality of photosensors disposed on a surface of the first substrate close and opposite to the first surface of the second substrate;
     wherein the first surface and the second surface have different optical properties, the first surface serves as an incident surface to receive a first light completely penetrating through the second substrate to emit from the second surface; when the second surface receives a second light, a portion of the second light at a specific wavelength penetrates through the second substrate and is emitted from the first surface while the other portion of the second light at other wavelengths are totally reflected by the second surface, the plurality of photosensors detect the second light at the specific wavelength penetrating through the second substrate, and output corresponding detecting signals.

2. The touchscreen of claim 1, further comprising a processing circuit connecting with the plurality of photosensors, wherein the processing circuit receives the detecting signals from the photosensors, and determines a contact position based on the detecting signals.

3. The touchscreen of claim 2, wherein the intensity of the second light at the specific wavelength detected by the photosensors corresponding to the contact position is less than the intensity of the second light at the specific wavelength detected by other photosensors without corresponding to the contact position, and the detecting signals output by the photosensors corresponding to the contact position are different from the detecting signals output by the other photosensors without corresponding to the contact position.

4. The touchscreen of claim 2, wherein the processing circuit is disposed on the surface of the first substrate close and opposite to the first surface of the second substrate.

5. The touchscreen of claim 1, wherein the second light is external ambient light.

6. The touchscreen of claim 5, wherein the external ambient light at the specific wavelength is ultraviolet rays.

7. The touchscreen of claim 1, wherein the photosensors comprise photodiodes.

8. The touchscreen of claim 1, wherein the photosensors comprise phototriodes.

9. An electronic device, comprising:
   a display device; and
   a touchscreen, comprising:
     a first substrate close to the display device;
     a second substrate opposite to the first substrate, comprising:
       a first surface close and opposite to the first substrate, and
       a second surface opposite to the first surface; and
     a plurality of photosensors disposed on a surface of the first substrate close and opposite to the first surface of the second substrate;
     wherein the first surface and the second surface have different optical properties, the first surface serves as an incident surface to receive a first light completely penetrating through the second substrate to emit from the second surface; when the second surface receives a second light, a portion of the second light at a specific wavelength penetrates through the second substrate and is emitted from the first surface while the other portion of the second light at other wavelengths are totally reflected by the second surface, the plurality of photosensors detect the second light at the specific wavelength penetrating through the second substrate, and output corresponding detecting signals.

10. The electronic device of claim 9, further comprising a processing circuit connecting with the plurality of photosensors, wherein the processing circuit receives the detecting signals from the photosensors, and determines a contact position based on the detecting signals.

11. The electronic device of claim 10, wherein the processing circuit calculates positional coordinates of the contact position based on the detecting signals, and outputs the positional coordinates to the display device.

12. The electronic device of claim 11, wherein the intensity of the second light at the specific wavelength detected by the photosensors corresponding to the contact position is less than the intensity of the second light at the specific wavelength detected by other photosensors without corresponding to the contact position, and the detecting signals output by the photosensors corresponding to the contact position are different from the detecting signals output by the other photosensors without corresponding to the contact position.

13. The electronic device of claim 10, wherein the processing circuit is disposed on the surface of the first substrate close and opposite to the first surface of the second substrate.

14. The electronic device of claim 9, wherein the second light is external ambient light.

15. The electronic device of claim 14, wherein the external ambient light at the specific wavelength is ultraviolet rays.

16. The electronic device of claim 9, wherein the first light is display light emitting from the display device.

17. The electronic device of claim 9, wherein the photosensors comprise photodiodes.

18. The electronic device of claim 9, wherein the photosensors comprise phototriodes.

* * * * *